F. G. & E. A. FLOYD.
Stirrer for Seed Dropper.
No. 81,156.
Patented Aug. 18, 1868.
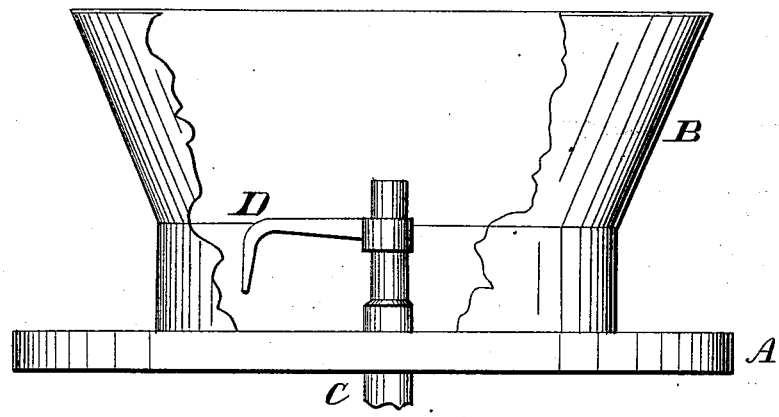
Witnesses:
Frederic Thomas
E. R. Beadle
Inventor:
F. G. & E. A. Floyd by
H. W. Beadle, atty.

United States Patent Office.

F. G. FLOYD AND E. A. FLOYD, OF MACOMB, ILLINOIS.

Letters Patent No. 81,156, dated August 18, 1868.

IMPROVEMENT IN STIRRER FOR SEED-SOWERS.

*The Schedule referred to in these Letters Patent and making part of the same.*

TO ALL WHOM IT MAY CONCERN:

Be it known that we, F. G. FLOYD, and E. A. FLOYD, of Macomb, in the county of McDonough, and State of Illinois, have invented a new and useful Improvement in Stirrers for Seed-Sowers; and we do hereby declare that the following is a full and exact description of the same, reference being had to the accompanying drawings, and to the letters of reference marked thereon.

This invention relates to an improved arrangement for stirring the grain in the hopper of our broadcast seed-sower, patented April 2, 1867, which consists in a bent arm, suitably attached to the top of the main shaft, as will be fully described hereinafter.

In the drawings, A represents the frame of our improved sower, upon the top of which is located the hopper B.

C represents the main shaft, which passes through the top of the frame up into the hopper.

D represents a bent arm, as shown, which is provided with an eye, as shown, which passes over shaft C. This eye, if square, will be securely held without fastening, as its own weight will keep it in place, the shaft being tapering in form to permit it to set down securely upon it. If the shaft is round, the eye should be of corresponding shape. A set-screw, or other similar arrangement, will then be needed to confine the arm.

By this arrangement, when power is applied to the shaft C, the arm D revolves with it, and acts as a stirrer, by which means the grain is delivered regularly to the hopper-hole, and all tendency to clog is thereby prevented.

Having thus fully described our invention, what we claim as new, and desire to secure by Letters Patent, is—

The rotating arm D, attached to the shaft C, as shown and described, and arranged to revolve within the hopper B, for the purpose set forth.

This specification signed and witnessed, this 3d day of March, 1868.

F. G. FLOYD,
E. A. FLOYD.

Witnesses:
CHAS. CHANDLER,
C. A. LAWSON.